(No Model.)

S. M. KANE.
GLASS POT AND FORE PLATE FOR SAME.

No. 265,966. Patented Oct. 17, 1882.

Witnesses
Hunter Reese.
Frank M. Reese.

Inventor
Samuel M. Kane
by
Jacob Reese
Attorney

UNITED STATES PATENT OFFICE.

SAMUEL M. KANE, OF ROCHESTER, PENNSYLVANIA.

GLASS-POT AND FORE-PLATE FOR SAME.

SPECIFICATION forming part of Letters Patent No. 265,966, dated October 17, 1882.

Application filed June 26, 1882. (No model.)

*To all whom it may concern:*

Be it known that I, SAMUEL M. KANE, residing at Rochester, in the county of Beaver and State of Pennsylvania, have invented a certain new and useful Improvement in Glass-Pots and Fore-Plates for Same; and I do hereby declare the following to be a full, clear, and exact description thereof, reference being had to the accompanying drawings, forming a part thereof.

In the manufacture of glass, when the material is melted and refined in closed pots, the pots are so constructed that their mouths through which the material is charged and withdrawn extends to a point outside of the furnace, but not to the outer edge of the furnace-wall in front of the pot. In placing a glass-pot in the furnace the front wall is built up to the proper height and caused to abut against the mouth of the pot, and extending beyond the mouth about ten or twelve inches. The object of thus extending the wall so far in front of the pot is that a sufficient space may be left between the pot and the wall, so that the hot products of combustion may surround the pot and keep all portions of it at a uniform temperature. The material from which glass is made is composed principally of acids and alkalies, and possesses great fluxing qualities. In charging the material into the pots they are filled above the bottom of their mouths, and in melting a portion of the material runs out of the mouth and cuts its way downward between the mouth and the wall. When this outer wall is made of brick or tile, as heretofore practiced, the glass material fluxes the brick or tile, and this fluxes the mouth of the pot, and thus by the continual expansion and contraction the opening is increased. When the material has become melted it settles down below the mouth of the pot, and does not thereafter run out of the mouth, but in settling down the bulk is so greatly diminished that although the mouth of the pot is closed with a stopper an internal suction is formed; and I find that the sulphurous gases are drawn up through the cracks between the mouth of the pot and the wall, and the sulphur enters the pot and causes the glass to assume a greenish color, which is very objectionable when tumblers or table-ware is produced. By the use of my improved glass-pot and fore-plate, as in practice at the Rochester Tumbler Works—the largest establishment of its class in the world—no sulphur can enter the pot, and crystal white glass may be produced continuously.

Figure 1:
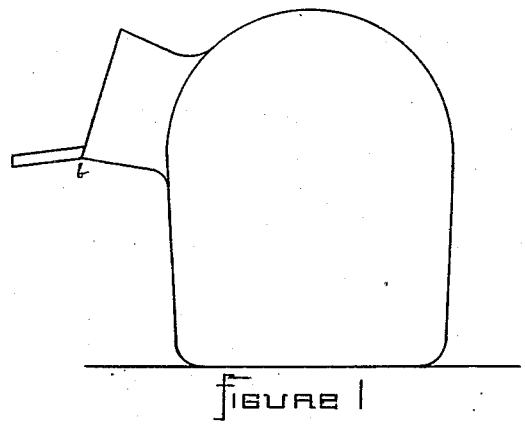
Figure 2:
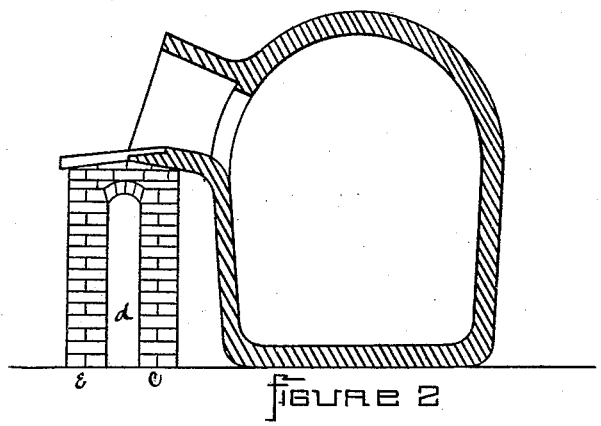
Figure 3:
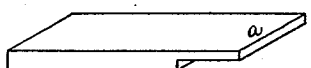

Figure 1 of drawings is a side elevation of a glass-pot with my improved fore-plate in place. Fig. 2 is a cross-section of same with the front wall in place. Fig. 3 is a perspective view of the fore-plate.

My invention consists in forming a depression in the lower part of the mouth of the pot, extending from the outer edge inward about six inches, and from one side of the mouth to the other. This depression I usually make three-quarters of an inch deep, or about one-half the thickness of the fore-plate.

The second feature of my invention is a fore-plate made in such a manner as to enter the mouth of the pot for a distance of six inches, more or less, according to the length and shape of the mouth. I prefer to make a counter offset in the lower surface of the fore-plate, so as to cause it to fit closely on its upper end, $a$, as well as its lower offset, $b$. Care should be taken to have these offsets so made that close joints may be made, and that the surfaces of the fore-plate and the lower part of the mouth may be even. The width of the fore-plate should be equal to the width of the mouth, and of such length as to project a short distance beyond the outer wall, and of about one and a half inch in thickness. These fore-plates may be made of any suitable material; but in practice I have found that cast-iron gives the best results.

When the pot has been put in place and the front wall or walls built up the lower face of the fore-plate is coated with clay or cement and firmly bedded in position. When the glass material melts and runs down and strikes the end $a$ of the fore-plate it chills and forms a ridge, and is thus prevented from running out; and as the material does not flux the iron there is no cutting action on the fore-plate, nor does it cut the mouth of the pot; but if the fore-plate is made of common tile or fire-brick the glass material first fluxes the tile or brick, and then this new combination will flux the pot and cut away its edge. By the use of an iron fore-plate no cutting or fluxing action takes place.

In common practice the wall $c$ in front of the pot is built of fire-brick nine inches thick. The space $d$ is four inches wide, and the outer wall, $e$, is four inches thick, the space $d$ being filled with loose sand, broken brick, or clay. In the drawings, Fig. 2, I have shown this middle space arched at the top, so that it may be used as an air-chamber, by means of which the front wall, $e$, may be kept cool and the heated air used for the combustion of the fuel in the furnace.

Glass-pots are sometimes made by the parties who use them, but are largely made by parties having special facilities, who produce them as articles of manufacture.

I am aware that in the manufacture of cast-glass it has been proposed to melt the glass in closed pots having a shoulder formed in the mouth thereof for the reception of a stopper, and that subsequent to melting, in casting the molten mass, a detachable copper spout or mouth-piece has been inserted to facilitate the pouring of the molten glass; and I do not herein claim the same, for the reason that such a spout could not be employed in charging and melting, as in the present invention, nor could it be left in place while gathering and working from fixed pots, as herein contemplated. The present invention relates to a different period or step in glass-making.

What I claim as my invention, and desire to secure by Letters Patent, is—

1. A glass-pot having a mouth of substantially uniform thickness, except at its bottom, and said bottom being recessed to form a seat for the reception of a fore-plate, substantially as and for the purpose specified.

2. A metallic fore-plate adapted for use with glass-pots, said fore-plate having an offset, whereby it may engage with the mouth of the pot, substantially as and for the purpose specified.

3. The combination, with a glass-pot and the front wall of the furnace, of a fore-plate arranged and luted within the mouth of the pot, substantially as and for the purpose specified.

SAMUEL M. KANE.

Witnesses:
HENRY C. FRY,
ED. C. CRITCHLOW.